United States Patent [19]
Sankey

[11] 3,736,505
[45] May 29, 1973

[54] ELECTRICAL CONNECTOR HAVING A VOLTAGE TEST POINT

[75] Inventor: Edward L. Sankey, New Berlin, Wis.

[73] Assignee: RTE Corporation, Waukesha, Wis.

[22] Filed: Sept. 7, 1971

[21] Appl. No.: 178,352

[52] U.S. Cl. ............... 324/133, 174/11 BH, 324/122, 340/252 R
[51] Int. Cl. ......................... G01r 19/14, G08b 21/00
[58] Field of Search ............................. 324/133, 122; 174/18, 73 R, 142, 143, 152 R, 11 BH; 340/252 R; 339/113 R

[56] References Cited

UNITED STATES PATENTS

| 3,576,493 | 4/1971 | Tachick | 324/133 |
| 1,902,617 | 3/1933 | Burr | 174/143 |
| 3,343,153 | 9/1967 | Waehner | 324/133 |
| 3,513,394 | 5/1970 | Tachick | 324/133 |

Primary Examiner—Rudolph V. Rolinec
Assistant Examiner—Ernest F. Karlsen
Attorney—Ronald E. Barry et al.

[57] ABSTRACT

An electrical connector for terminating a high voltage cable of the type having an electrically conductive sheath, a cable insulation and an electrical conductor, the connector including an insulator surrounding the cable insulation and the conductor, an electrically conductive electrode embedded in said insulator in spaced relation to the conductor and projecting outwardly from the outer surface of said insulator, and a conductive shield covering the outer surface of the insulator and being spaced from the electrode. A conductive cap is releasably secured to said shield to enclose the outwardly extending end of the electrode and an electrically non-conductive disc is located between the inner surface of the cap and the end of the conductive electrode.

10 Claims, 3 Drawing Figures

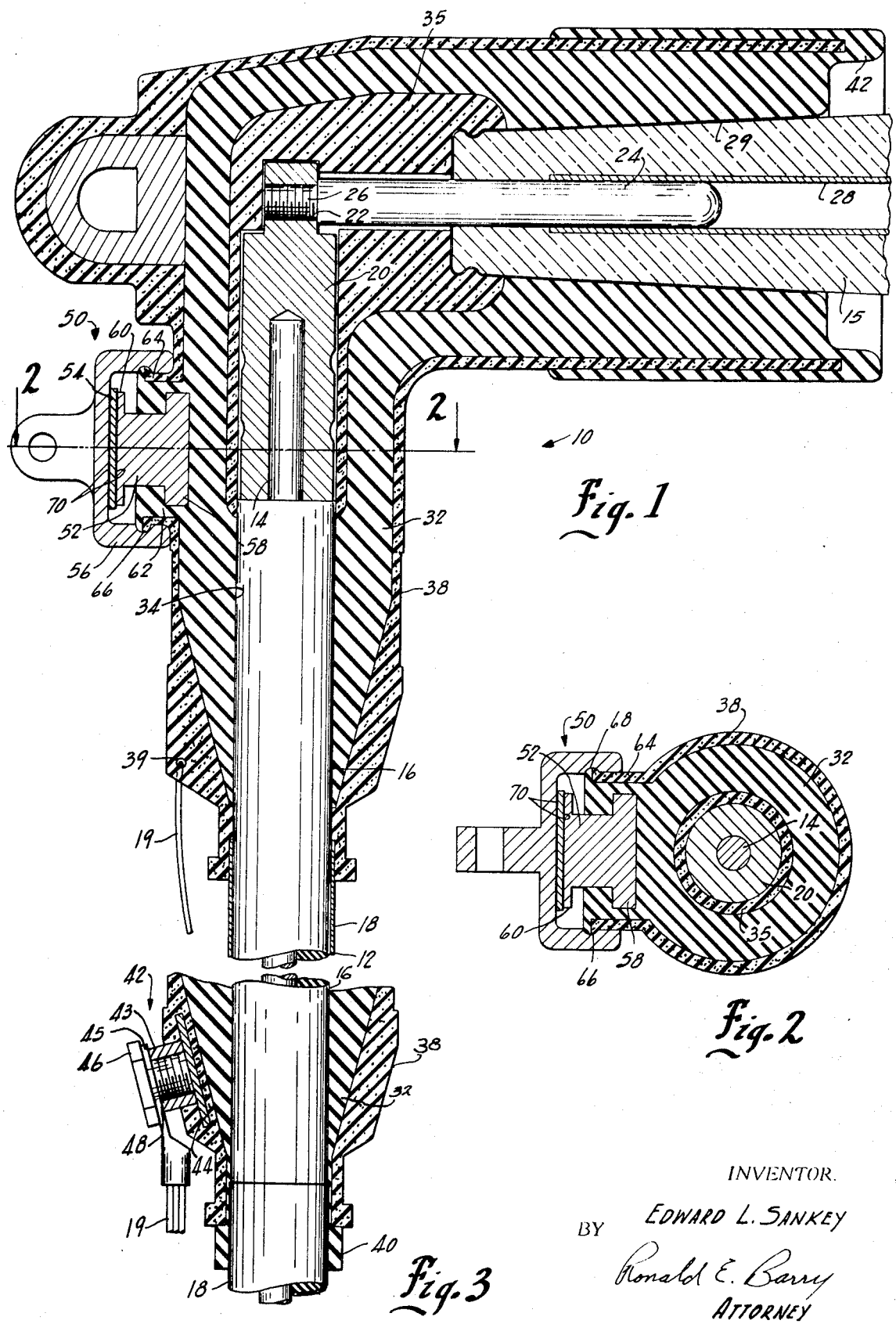

ELECTRICAL CONNECTOR HAVING A VOLTAGE TEST POINT

BACKGROUND OF THE INVENTION

Voltage detecting devices of the type contemplated herein are used to determine whether there is a voltage in the conductor of a high voltage cable. The connection or termination of a high voltage cable is normally shielded making it difficult to determine the presence of a voltage without disconnecting the connector. In a voltage detecting connector of the type shown in the Brown, et al U.S. Pat. No. 3,390,331, an electrode is embedded within the insulator and is normally grounded by a conductive cap which is connected to the conductive shield on the connector. Since the electrode is grounded, the capacitance value is limited to the allowable dielectric strength or thickness of the insulating material between the electrode and the conductor. The voltage in the conductor is tested by removing the cap from the cable sheath to expose the end of the electrode. A highly sensitive voltage detecting device is then applied to the exposed electrode to determine the absence or presence of a voltage.

SUMMARY OF THE INVENTION

The voltage detecting connector of the present invention provides a simplified system for detecting voltage in a high voltage cable that eliminates or reduces objectionable corona. The connector is provided with an insulator and a conductive shield which can be connected to the conductive sheath of the cable. An electrically conductive plug or electrode is embedded within the cable insulation in a spaced relation to the high voltage cable and extends outwardly from the cable insulation in a spaced relation to the conductive shield. A capacitive disc is provided on the end of the plug and an electrically conductive cap is secured to the shield in abutting relation to the conductive disc. The capacitive disc acts as a voltage divider thereby reducing stress between the electrode and cable conductor.

Other objects and advantages of this invention will become apparent from the following description when read in connection with the accompanying drawings.

THE DRAWINGS

FIG. 1 is a side elevation view in section showing the voltage test point and shielding arrangement of this invention;

FIG. 2 is a cross section view taken on line 2—2 of FIG. 1 showing the voltage test point arrangement; and FIG. 3 is a view of an alternative embodiment of the invention showing a disconnect assembly for connecting the connector shield to the conductive sheath of the cable through the concentric wires on the cable.

DESCRIPTION OF THE INVENTION

The electrical connector 10 of the present invention is used to connect a high voltage cable 12 to a receptacle 15 for any of a number of high voltage devices such as a distribution transformer. The high voltage cable 12 includes a conductor 14, cable insulation 16, an electrically conductive cable sheath 18, and a concentric in the form of a number of strands of wire 19. As is generally understood in the art, a portion of the insulation 16 is stripped from the end of the cable 12 to expose the conductor 14 and the conductive cable sheath 18 is stripped from the cable to expose a portion of the insulation 16. The cable 12 is prepared for connection to the connector 10 by securing or crimping a conductive member 20 to the exposed portion of the conductor 14. The conductive member 20 includes at the inner end a threaded aperture 22. Upon insertion of the conductive member 20 into the connector an electrically conductive member 24 having a threaded section 26 is screwed into the aperture 22. The conductive member 24 projects outwardly into a recess 29 for connection to a conductive member 28 in the receptacle 15.

In accordance with the invention, the electrical connector 10 includes an insulating member 32 having an aperture or opening 34 for engagement with the outer surface of the cable insulation 16. Electrical stress on the void around the conductors 20 and 24 can be eliminated by providing an electrically conductive elastomer 35 in the insulating member 32. An electrically conductive shield 38 is provided on the outer surface of the insulating member 32 and extends beyond the end of the insulating member 32. The cable 12 is inserted into the opening 34 in the insulating member 32 to electrically engage the shield 38 and cable sheath 18 by means of an interference fit. The cable concentric 19 is attached to an opening 39 provided in the side of the shield 38. The shield 38 is thereby grounded.

The insulating member 32 can be formed of any resilient insulating material such as an elastomer or rubber. The conductive shields 35 and 38 can be made of the same material as the member 32 with the addition of a conductive material such as lampblack, graphite or carbon black.

Voltage detection can be achieved by means of a capacitive electrode assembly 50 which includes an electrically conductive electrode or plug 52, a capacitive insulating disc 54 and an electrically conductive cap 56. In this regard, the plug 52 includes flanges 58 and 60 at each end. The plug 52 is embedded in an annular protrusion 62 which projects outwardly through the shield 38. The connector shield 38 is provided with a collar or ring 64 which encircles the protrusion 62 and includes a small annular flange 66 around the upper edge. The electrically conductive cap 56 includes an annular groove 68 which matingly engages the flange 66 to retain the cap on the connector and to provide electrical continuity between the cap 56 and the shield 38.

Means in the form of the disc 54 is provided between the cap 56 and the flange 60 of the plug 52 to produce a capacitive couple between the cap 56 and the electrode 52. In the preferred form of the invention, the disc 54 is provided with a conductive coating 70 on each surface to assure positive contact with the plug 52 and the cap to thereby eliminate noise.

During normal operation, it should be apparent that the shield 38 is made continuous by use of conductive cap 56 and the voltage stress between the plug 52 and the hot shield 35 is not full line to ground potential but limited to any preselected value determined by the ratio of capacitives. To make a voltage check the cap 56 and disc 54 are removed and an appropriate sensing device connected to plug 52.

In the alternative embodiment of the invention shown in FIG. 3, the conductive shield 38 is insulated from the cable sheath 18 by means of an extension 40 of the insulation 32 which is located between the shield 38 and cable sheath 18. Means are provided for grounding the shield 38 in the form of a disconnect assembly 42 which includes a threaded sleeve 43 having a flange 44 on the inner end and a hexagonal bolt 46. A portion of the sleeve 43 and the flange 44 are embedded in the shield 38. The sleeve 43 projects outward from the outer surface of the shield 38. A ground connection is made by wrapping a number of strands 19 of the concentric around the threaded portion 48 of the bolt 46. The bolt 46 is then tightened in the sleeve 43. A washer 45 can be used to hold the strands 19 in tight engagement with the sleeve 43.

I claim:

1. A high voltage cable connector having a test point for determining the presence of a voltage in the conductor of the high voltage cable,
   said connector including an insulating member surrounding the conductor,
   a conductive electrode partially embedded in said insulator in a spaced relation to said conductor,
   a conductive shield on the outer surface of said insulating member and being spaced from said electrode,
   a removable conductive cap electrically connected to said shield and enclosing the exposed portion of said electrode in spaced relation to said electrode,
   a dielectric disc removable with said cap and positioned between said electrode and said cap for providing a capacitive couple between said cap and said plug and exposing said electrode for direct contact by testing means when said cap and said disc are removed.

2. The connector according to claim 1 including a conductive material on each surface of said disc.

3. The connector according to claim 1 wherein said insulator includes a section at each end extending beyond the ends of said conductive shield to insulate the shield from the cable and means for selectively connecting said shield to said sheath.

4. The connector according to claim 3 wherein said connecting means includes an electrically conductive sleeve embedded in said shield and a bolt which is adapted to be threadedly received in said sleeve and connected to ground.

5. The connector according to claim 1 wherein said outer shield is connected to the cable sheath.

6. In a high voltage cable connector having an insulating member, an inner conductive shield and an outer conductive shield, a test point assembly for determining the presence of a voltage on the conductor, said test point assembly including,
   an electrically conductive plug partially embedded in said insulating member and having one end spaced from said inner conductive shield and the other end extending outwardly through said outer shield and being spaced therefrom,
   a removable conductive cap electrically connected to the outer shield and enclosing the outer end of said plug, said cap being spaced from said plug,
   and an insulating disc carried by said cap and positioned between said cap and the exposed end of said plug when said cap is placed on the shield whereby a capacitive couple is formed between said cap and plug and whereby said electrode is exposed for direct contact by testing means when said cap is removed.

7. The cable connector according to claim 6 including means for connecting said outer shield to ground.

8. The cable connector according to claim 7 wherein said connecting means includes a reduced diameter section at the end of said shield to provide an interference fit with said cable.

9. The cable connector according to claim 7 wherein said connecting means includes a disconnect assembly having a sleeve embedded in said shield and a screw connected to said cable concentric and to said sleeve.

10. The connector according to claim 6 wherein said disc includes an electrically conductive material on each surface.

* * * * *